(12) United States Patent
Goldman

(10) Patent No.: US 6,544,609 B1
(45) Date of Patent: Apr. 8, 2003

(54) STIFF AND IMPACT RESISTANT COMPOSITIONS CONTAINING POLY(PROPYLENE) OR POLY(ETHYLENE/ PROPYLENE) AND CALCIUM CARBONATE FOR CLOSURES

(75) Inventor: Anatoliy Goldman, Indianapolis, IN (US)

(73) Assignee: Alcoa Closure Systems International, Inc., Crawfordsville, IN (US)

( * ) Notice: Subject to any disclaimer, the term of this patent is extended or adjusted under 35 U.S.C. 154(b) by 276 days.

(21) Appl. No.: 09/614,618

(22) Filed: Jul. 12, 2000

(51) Int. Cl.[7] .............................................. B65D 39/00
(52) U.S. Cl. ..................... 428/35.7; 523/205; 523/206; 523/210; 524/425; 524/528
(58) Field of Search ................... 428/35.7; 523/205, 523/206, 210; 524/425, 528

(56) References Cited

U.S. PATENT DOCUMENTS

| | | | |
|---|---|---|---|
| 3,700,614 A | 10/1972 | Schenkerberg | 260/23 |
| 3,981,412 A | * 9/1976 | Asmus | 220/270 |
| 4,342,810 A | 8/1982 | Adcock | 428/215 |
| 4,560,712 A | 12/1985 | Chang | 323/220 |
| 4,666,063 A | 5/1987 | Holoubek et al. | 222/107 |
| 4,887,732 A | 12/1989 | Matsubayashi et al. | 220/90.6 |
| 5,061,532 A | 10/1991 | Yamada | 428/35.7 |
| 5,095,063 A | 3/1992 | Okada et al. | 524/413 |
| 5,328,058 A | 7/1994 | Leoncavallo et al. | 222/153 |
| 5,502,112 A | * 3/1996 | Peacock | 525/240 |
| 5,542,557 A | 8/1996 | Koyama et al. | 215/347 |
| 5,563,188 A | 10/1996 | Ziems | 523/218 |
| 5,660,303 A | 8/1997 | Hirose | 220/791 |
| 5,880,195 A | 3/1999 | Kallnowski et al. | 524/426 |

FOREIGN PATENT DOCUMENTS

| | | |
|---|---|---|
| EP | 0 084 922 | 8/1983 |
| GB | 905 069 | 9/1962 |
| GB | 1 589 923 | 5/1981 |

OTHER PUBLICATIONS

D.B. Todd, "The Werner–Pfleiderer Twin–Screw Co–Rotating Extruder" *Plastic Compounds*, Ed., Hanser/Gardner Publications, Inc., Cincinnati, 1998, pp. 94 and 95.

European Polymer Journal, 36 (2000) 137–138, "The performance of selected unsaturated coatings for calcium carbonate filler in polypropylene", Arunee Tabtiang, Richard Venables, pp 137–148.

PCT International Search Report, Pct/US01/21752, Apr. 2, 2002, 7 pages.

* cited by examiner

*Primary Examiner*—Harold Pyon
*Assistant Examiner*—Walter B Aughenbaugh
(74) *Attorney, Agent, or Firm*—Wood, Phillips, Katz, Clark & Mortimer; Edward L. Levine

(57) ABSTRACT

Stiff and impact resistant closures derived from the stiff and impact resistant blends including poly(propylene) or poly (ethylene/propylene) and calcium carbonate; stiff and impact resistant compositions including poly(propylene) or poly(ethylene/propylene) and calcium carbonate. A presently preferred blend contains from about 40 to about 60 weight percent of poly(propylene) or poly(ethylene/ propylene) and from about 25 to about 35 weight percent of calcium carbonate particles treated with fatty acid, the treated particles having a particle size of from about 2.5 to about 3.5 microns.

6 Claims, 2 Drawing Sheets

STIFF AND IMPACT RESISTANT COMPOSITIONS CONTAINING POLY(PROPYLENE) OR POLY(ETHYLENE/PROPYLENE) AND CALCIUM CARBONATE FOR CLOSURES

FIELD OF THE INVENTION

The invention is directed to stiff and impact resistant closures derived from the stiff and impact resistant blends including poly(propylene) or poly(ethylene/propylene) and calcium carbonate; stiff and impact resistant compositions including poly(propylene) or poly(ethylene/propylene) and calcium carbonate; methods for increasing stiffness and impact resistance of a poly(propylene) or poly(ethylene/propylene) resin, or a closure; and a method for measuring the impact strength of a closure or a resin at a reduced temperature. A presently preferred blend contains from about 40 to about 60 weight percent of poly(propylene) or poly(ethylene/propylene) and from about 25 to about 35 weight percent of calcium carbonate particles treated with fatty acid, the treated particles having a particle size of from about 2.5 to about 3.5 microns.

BACKGROUND OF THE INVENTION

Polymers such as polypropylene or polymers formed from the polymerization of propylene and at least one other monomer have been utilized extensively for making closures. It is desirable to have a stiff and impact resistant closure, both at room temperature, as well as at reduced temperature. Properties of increased stiffness and increased impact resistance are advantageous for any structural materials, to avoid cracking when the structural materials are impacted.

The properties of the closure at reduced temperature are important when closures are to be used on containers stored at reduced temperatures, or when closures are destined to be used on containers for use in cooler climates. Therefore, improvements in closures made from compositions including polypropylene have focused on increasing the stiffness and the impact strength of the polymer. However, when one of these properties is improved, the other is usually worsened. For example, when stiffness is increased, impact strength normally is decreased. It would be very useful to be able to improve both of these characteristics at the same time.

I have now discovered that a conventional filler for polymeric compositions, of a certain particle size and in a certain proportion, may surprisingly provide the highly desirable result of improving both impact strength and stiffness of the polymeric composition to which it is added. This additive is calcium carbonate, used as a filler in polymeric compositions.

Inorganic fillers such as calcium carbonate are frequently added to polymers. Examples of other fillers include talc, kaolin, clays, silica, alumina, mica, carbon black, $TiO_2$, ZnO and $Sb_2O_3$. Conventionally, calcium carbonate is utilized as a filler for resins such as polypropylene. When improved impact resistance is desired, other additives to achieve this property are introduced, such as rubber. Therefore, although calcium carbonate has been utilized as an additive to reduce the cost of a resin, it has not been considered to be useful for the improvement of both stiffness and impact resistance of a resin. Moreover, addition of calcium carbonate to a resin has not been considered to improve impact resistance both at room temperature and at reduced temperature.

Therefore, a polymeric composition for use in making closures which has both improved stiffness and improved impact resistance would be desirable.

SUMMARY OF THE INVENTION

The invention is directed to a closure for a container comprising a top and a depending shell, said closure is formed of a stiff and impact resistant polymeric blend having from about 40 to about 60 weight percent of a polymer selected from the group consisting of poly(propylene) and poly(ethylene/propylene); and from about 25 to about 35 weight percent of calcium carbonate particles treated with fatty acid, wherein said calcium carbonate particles have a particle size of from about 2.5 to about 3.5 microns, wherein said closure has a falling weight impact resistance at –20° C. of from about 0.4 to about 2.5 joules and a stiffness at room temperature of from about 1800 to about 2200 megapascals.

The invention is also directed to a closure for a container comprising a top and a depending shell, said closure is formed of a stiff and impact resistant polymeric blend having from about 40 to about 60 weight percent of a polymer selected from the group consisting of poly(propylene) and poly(ethylene/propylene) and from about 25 to about 35 weight percent of calcium carbonate particles treated with fatty acid, wherein said calcium carbonate particles have a particle size of from about 2.5 to about 3.5 microns, wherein said closure has a falling weight impact resistance at room temperature of from about 0.8 to about 4.0 joules and a stiffness at room temperature of from about 1800 to about 2200 megapascals.

The invention is also directed to a closure for a container comprising a top and a depending shell, said closure is formed of a stiff and impact resistant polymeric blend having from about 40 to about 60 weight percent of a polymer selected from the group consisting of poly(propylene) and poly(ethylene/propylene) and from about 25 to about 35 weight percent of calcium carbonate particles treated with fatty acid, wherein said calcium carbonate particles have a particle size of from about 2.5 to about 3.5 microns, wherein said closure has a falling weight impact resistance at –20° C. of from about 0.4 to about 2.5 joules, a falling weight impact resistance at room temperature of from about 0.8 to about 4.0 joules and a stiffness at room temperature of from about 1800 to about 2200 megapascals.

The invention is also directed to a method of increasing stiffness and impact resistance in a closure comprising the steps of:

a) making a stiff and impact resistant polymeric blend by compounding from about 40 to about 60 weight percent of a polymer selected from the group consisting of poly(propylene) and poly(ethylene/propylene) with from about 25 to about 35 weight percent of calcium carbonate particles treated with fatty acid, wherein said calcium carbonate particles have a particle size of from about 2.5 to about 3.5 microns; and then, b) molding said blend into a closure.

The invention is also directed to a stiff and impact resistant polymeric composition comprising:

from about 40 to about 60 weight percent of a polymer selected from the group consisting of poly(propylene) and poly(ethylene/propylene); and, from about 25 to about 35 weight percent of calcium carbonate particles treated with fatty acid, wherein said calcium carbonate particles have a particle size of from about 2.5 to about 3.5 microns, wherein said composition has a falling weight impact resistance at –20° C. of from about 0.4 to about 2.5 joules and a stiffness at room temperature of from about 1800 to about 2200 megapascals.

Such a composition is very useful as a structural material for a closure. The invention is also directed to a stiff and impact resistant polymeric composition comprising:

from about 40 to about 60 weight percent of a polymer selected from the group consisting of poly(propylene) and poly(ethylene/propylene); and, from about 25 to about 35 weight percent of calcium carbonate particles treated with fatty acid, wherein said calcium carbonate particles have a particle size of from about 2.5 to about 3.5 microns, wherein said composition has a falling weight impact resistance at room temperature of from about 0.8 to about 4.0 joules and a stiffness at room temperature of from about 1800 to about 2200 megapascals.

The invention is also directed to a stiff and impact resistant polymeric composition comprising:

from about 40 to about 60 weight percent of a polymer selected from the group consisting of poly(propylene) and poly(ethylene/propylene); and, from about 25 to about 35 weight percent of calcium carbonate particles treated with fatty acid, wherein said calcium carbonate particles have a particle size of from about 2.5 to about 3.5 microns, wherein said composition has a falling weight impact resistance at $-20°$ C. of from about 0.4 to about 2.5 joules, an impact resistance at room temperature of from about 0.8 to about 4.0 joules and a stiffness at room temperature of from about 1800 to about 2200 megapascals.

For any of the above-mentioned compositions, the fatty acid may be stearic acid; and the compositions may also include at least one additive such as pigments, lubricants, anti-oxidants, emulsifiers and a combination thereof. The compositions described above may be used to manufacture any product wherein structural materials having increased stiffness and impact resistance is desirable, such as automobile parts, containers, or laundry tubs among others; in addition to the closures described herein.

The invention is also directed to a method for increasing the impact strength and stiffness of a polypropylene or poly(ethylene/propylene) resin comprising the step of compounding from about 40 to about 60 weight percent of said resin with from about 25 to about 35 weight percent of calcium carbonate particles treated with fatty acid, wherein said calcium carbonate particles have a particle size of from about 2.5 to about 3.5 microns.

The impact strength of the above-mentioned method may be room temperature impact strength, cold temperature impact strength, or room temperature impact strength and cold temperature impact strength.

In the methods described above, the compounding may be carried out in an extruder at a die temperature of 350–425° F., a rate of 20–40 lbs/hr and a screw speed of 200–500 rpm to obtain good dispersion of the calcium carbonate particles; and the extruder may be a twin screw extruder having at least a first temperature zone, a second temperature zone, a third temperature zone and a fourth temperature zone. The first, second, third and fourth temperature zones may each be maintained at a temperature of 400° F.

The invention is also directed to a method for measuring impact strength of a closure at a reduced temperature comprising the steps of:

a) conditioning a closure for forty hours at 23° C. and 50% relative humidity according to ASTM D-4101 to produce a conditioned closure;

b) acclimating said conditioned closure for two hours at a reduced temperature to produce an acclimated closure; and then, c) measuring impact resistance of said acclimated closure by the falling weight impact test according to ASTM D-5628-94.

The reduced temperature for the method described above may be 0° C., $-20°$ C. or $-40°$ C.

DETAILED DESCRIPTION OF THE DRAWINGS

DETAILED DESCRIPTION OF THE INVENTION

The Resins

Figure 1:
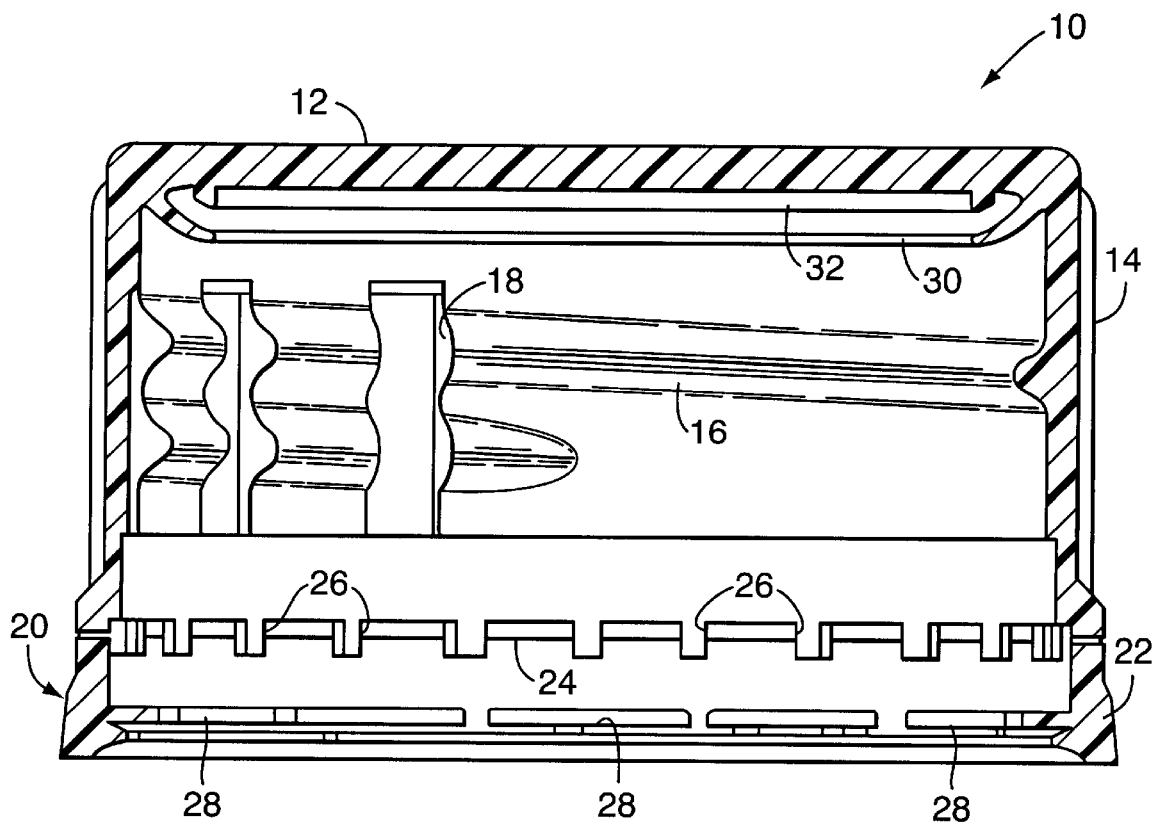
FIG. 1 is a cross-sectional view of a plastic closure embodying the principles of the present invention.

Polyolefins such as polyethylene, polypropylene or copolymers formed from propylene or ethylene with at least a second monomer may be utilized in the closure compositions. Polypropylene is a particularly preferred resin. Combinations of any of the above-mentioned polyolefins may also be utilized.

Preferably, the polymer is from about 40 to 60 weight percent of the polymeric composition. Polymers such as poly(propylene) or poly(ethylene/propylene) are presently preferred.

Calcium Carbonate

Calcium carbonate is obtained from a natural source, limestone. Most of the commercially mined deposits of calcium carbonate originated in the form of fossil shells in marine environment. The purity of the deposit is governed by the level of impurities in the marine environment. The majority of limestone deposits occur with silicas or clay-like muds, and thus are not suitable as high brightness fillers. Furthermore, many deposits react with magnesium compounds to form Dolomite, a calcium magnesium carbonate. Deposits are found in the U.S. in Vermont, Maryland, Georgia, Alabama and Southern California.

The calcium carbonate particles for use in the polymeric compositions of the present invention are treated with a fatty acid, to coat the particles. Upon treating the calcium carbonate particles with fatty acid, they become partially coated. This partial coating helps prevent agglomeration, and facilitates good dispersion throughout the composition. A useful fatty acid is stearic acid. Calcium carbonate particles having a particle size of from about 2.5 to about 3.5 microns are presently preferred. Such particles are available from several sources. The use of larger particles, such as those of from about 4.5 to about 6.0 microns is undesirable, as they have a tendency to agglomerate. Preferably, the coated calcium particles are from about 25% to about 35% by weight of the polymeric composition.

Other Constituents

The improved polymeric compositions including the polymer (polypropylene, a copolymer of propylene and at least one other monomer, or a combination of polypropylene with a copolymer of propylene and at least one other monomer) and calcium carbonate may also include other additives such as pigments, anti-oxidants, lubricants, or emulsifiers.

Pigments may be added to the closure compositions. In order to color the closure, or render it opaque, white pigments such titanium dioxide may be added; color pigments such as carbon black, red iron oxide, tartrazine lake or ultramarine blue (ULTRAMARINE BLUE NUBIX E-25, available from Clariant) may be added. Microencapsuled pigments may be particularly advantageous. Pigment is usually from about 0.2% to about 0.8% of the total composition.

Lubricants may also be added to the polymeric composition. Either single lubricants, or a combination of lubricants may be utilized.

The lubricants to be used in conjunction with the polymeric compositions may be erucamide; aliphatic hydrocarbon lubricants such as liquid paraffin, white mineral oils of industrial grade, synthetic paraffin, petroleum wax, petrolatum and odorless light hydrocarbons; silicones such as organopolysiloxanes; higher saturated fatty acids obtained from vegetable and animal oils and fats and hydrogenation products thereof, having 8 to 22 carbon atoms; hydroxystearic acid; linear aliphatic monohydric alcohols having at least 4 carbon atoms, obtained by reducing animal and vegetable oils and saturated fats or by cracking distillation of natural waxes; dodecyl alcohol, polyglycols such as polyethylene glycols having a molecular weight of 200 to 9500, polypropylene glycols having a molecular weight of at least 1000, and polyoxypropylene-polyoxyethylene block copolymers having a molecular weight of 1900 to 9000; alkali metal, alkaline earth metal, zinc or aluminum salts of higher saturated fatty acids; various metal soaps; low molecular weight olefin resins such as low molecular weight polyethylene, low molecular weight polypropylene and oxidized polyethylene; fluorine resins such as polytetrafluoroethylene, tetrafluoroethylene/hexafluoropropylene copolymer, polychlorotrifluoroethylene and polyvinyl fluoride; propylene glycol alginate, dialkyl ketone and acrylic copolymers among others.

Other lubricants include amides or amines such as higher fatty acid amides, 2-steroamidoethyl stearate, ethylene-bis-saturated fatty acid amides, N,N'-bis-(2-hydroxyethyl)-alkyl amides having 12 to 18 carbon atoms in the alkyl group; N.N'-bis(hydroxyethyl)-lauroamide, fatty acid diethanolamines and distearic acid esters of di(hydroxyethyl)-diethylene triamine monoacetate, fatty acid esters of monohydric or polyhydric alcohols such as n-butyl stearate, methyl ester of hydrogenated rosin, di-n-butyl sebacate, 2-ethylhexyl sebacate, octyl sebacate, glycerin fatty acid ester, stearic acid ester of pentaerythritol, pentaerythritol tetrastearate, sorbitan fatty acid ester, polyethylene glycol fatty acid ester, polyethylene glycol monostearate, polyethylene glycol dilaurate, polyethylene glycol monooleate, polyethylene glycol dioleate, polyethylene glycol coconut fatty acid ester, polyethylene glycol tall oil fatty acid ester, 1,3-butanediol diethylene glycol stearate and propylene glycol fatty acid ester among others, triglycerides and waxes such as hydrogenated edible oils and fats; cotton seed oil and other edible oils; linseed oil; palm oil; glycerin ester of 12-hydroxystearic acid; hydrogenated fish oils; beef tallow; spermaceti wax; montan wax; carnauba wax; bees' wax; haze wax; esters of monohydric aliphatic alcohols with aliphatic saturated acids such as hardened whale oil, lauryl stearate and stearyl stearate and lanoline among others.

The lubricant may be incorporated in an amount of 0.01 to 1.5% by weight, preferably 0.2 to 1% by weight, and especially preferably 0.4 to 0.5% by weight in the closure composition, based on the base resin. When the amount of the lubricant is too small and below this range, the opening torque becomes too high and the opening operation is difficult. When the amount of lubricant is too large and exceeds the above range, the application torque is too low, causing insufficient sealing.

Useful anti-oxidants include ascorbic acid; iso-ascorbic acid; gallic acid; tocopherol; hydroquinone; catechol; resorcine; dibutylhydroxytoluene; dibutylhydroxyanisole; pyrogallol; hydroxyphenylpropionates such as tetrakismethylene (3,5-di-t-butyl-4'-hydroxyphenyl propionate; alkyl phenols such as 2,6-di-tert-butyl-4-methylphenol; hydroxybenzyl compounds such as tris(3,5-di-t-butyl-4-hydroxybenzyl) isocyanurate; alkylidene bisphenols such as 2,2'-methylene-bis(4-methyl-6-t-butylphenol); phosphites and phosphonites such as bis(2,4-di-tert-butylphenyl) pentaerythritol diphosphite; sorbose; glucose; lignin; iron based anti-oxidants such as iron powder, activated iron, ferrous oxide and iron salt; inorganic anti-oxidants such as sulfite, thiosulfite, dithionite and hydrogen sulfite; polymers such as redox resins and polymer-metal complexes; zeolites; activated carbon or salts thereof among others. Combinations of the above-mentioned anti-oxidants will also have utility in the present closure compositions. Furthermore, useful anti-oxidants may contain catalysts, water-retentive agents or hydrates.

Preferably, the anti-oxidants are present in the closure composition in an amount of from about 0.1 to about 3% weight percent, more preferably in an amount of from about 0.2% to 2% weight percent, and most preferably in an amount of from about 0.5 to 1.5 weight percent.

When two anti-oxidants are used together in the closure compositions, the ratio of the first anti-oxidant to the second anti-oxidant is from about 1:5 to about 5:1, preferably from about 1:3 to about 3:1 and most preferably from about 1:2 to about 2:1.

Emulsifiers may be added to the closure compositions. Appropriate emulsifiers include non-toxic, non-ionic surfactants which are virtually tasteless at the concentrations employed, or at least devoid of any unpleasant or undesired taste. Examples are sorbitan polyoxyethylene fatty acid esters such as sorbitan polyethylene (20) mono-oleate (TWEEN 80).

The Method of Making the Composition

To make the polymeric composition of the present invention, polymer pellets were pre-mixed with calcium carbonate powder in the molten state in a 30 mm Werner and Pfleider twin screw extruder. The extrusion-mixing process was performed with a special screw design, so that the filler will be well-dispersed. A representative screw design, and mixing requirements for polymer compounding, are disclosed in "The Werner & Pfleiderer Twin-Screw Co-Rotating Extruder System" in *Plastics Compounding,* D. B. Todd Ed., Hanser/Gardner Publications, Inc., Cincinnati, 1998, pp. 94 and 95, hereby incorporated by reference.

The polymeric compositions may be formed by compounding coated calcium carbonate particles with the appropriate polymer. The compounding may be done in a twin screw extruder having four temperature zones along the barrel of the extruder. In general, compounding is carried out in a twin screw extruder at a die temperature of 350–425° F., a rate of 20–40 lbs/hr and a screw speed of 200–500 rpm. As a specific example of the compounding process, each of the four zones of the twin screw extruder may be held at a temperature of 400° F.; while the die temperature may be held at a temperature of 380° F. The rate may be 30 lbs/hr and the screw speed may be 322 rpm. Compounding should be performed at appropriate shear and temperature conditions such that blending occurs, but the polymer is not degraded.

The Closures

The compositions described above may be utilized to form closures. A presently preferred closure is described as follows.

While the present invention is susceptible of embodiment in various forms, there is shown in the drawings and will hereinafter be described a embodiment, with the understanding that the present disclosure is to be considered as an exemplification of the invention and is not intended to limit the invention to the specific embodiment illustrated.

Figure 2:
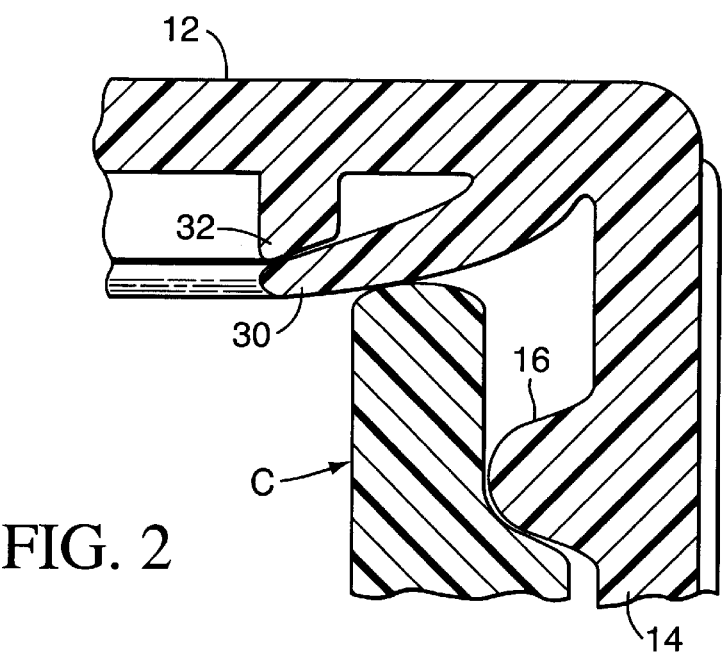
FIG. 2 is an enlarged, fragmentary view of the closure shown in FIG. 1 illustrated with an associated container.

With reference to FIGS. 1 and 2, therein is shown a container closure 10 which is used in conjunction with an associated container C. The closure includes a circular top wall portion 12, and a depending annular skirt portion 14. The closure includes an internal thread formation 16 on the skirt portion 14 for threaded cooperation with a thread formation on the associated container C.

In order to facilitate venting of gas pressure from within an associated container, the skirt portion 14 of the closure 10 defines a plurality of axially extending vent grooves 18.

In the illustrated embodiment, the closure 10 is configured for tamper-indication, and accordingly, includes an annular pilfer band 20 which depends from, and is at least partially frangibly connected to skirt portion 14. The pilfer band includes an annular band portion 22 which is distinguished from the skirt portion 14 by a circumferentially extending score 24 which separates the pilfer band from the skirt portion. A plurality of circumferentially spaced frangible bridges 26 extend between the inside surfaces of the skirt portion and pilfer band to provide the desired frangible connection therebetween.

In the illustrated embodiment, the pilfer band 20 of the closure 10 is configured in accordance with the teachings of U.S. Pat. No. 4,938,370, to McBride, hereby incorporated by reference. Accordingly, the illustrated pilfer band includes a plurality of circumferentially space, inwardly extending flexible projections 28 which are configured for cooperative engagement with the annular locking ring of the associated container C. The pilfer band of the closure 10 may be otherwise configured, such as in accordance with the teachings of U.S. Pat. No. 4,418,828, to Wilde et al., hereby incorporated by reference.

The illustrated closure 10 is of a linerless construction, that is, the closure does not include a sealing liner component or like element positioned near or adjacent to the top wall portion 12 for sealing engagement with an associated container. Rather, the closure includes an integral and unitary annular sealing lip 30 which projects inwardly generally from the juncture of top wall portion 12 and skirt portion 14. Annular sealing lip 30 is configured for resiliently flexible engagement with the associated container C, as shown in FIG. 2. The desired sealing cooperation between the sealing lip and the container is enhanced by the provision of an annular stop element 32 which depends from top wall portion 12 of the closure 10. As illustrated in FIG. 2, flexible sealing lip 30 is urged upwardly against the stop element 32 as the closure 10 is applied to the associated container C, with the stop element thus cooperating with the sealing lip to urge the sealing lip into sealing cooperation with the container C.

Making Closures From the Polymeric Compositions

Closures can be made from the polymeric blends of the present invention by compression molding on a 54-station rotary compression molding machine (HC-8A), for example. Test samples were made by injection molding the compositions on a Cincinnati Milacron Vista/Sentry machine. Appropriate temperatures and pressures can be determined by those skilled in the art.

The following Examples are presented to describe the preferred embodiments and utilities of the invention and are not meant to limit the invention unless otherwise stated in the claims appended hereto.

EXAMPLE 1

A DSC Perkin-Elmer Thermal analysis TAC/7DX was utilized to determine the thermal properties of the compositions. Crystallization and melting temperature were obtained for the compositions using calcium carbonate from different sources, each approximately of three micron particle size.

Test samples for each of these Examples were prepared in the following manner. Different blends of polymer and calcium carbonate were prepared using polypropylene homopolymer (PP, density=0.91 g/cm$^3$, available from Phillips Petroleum Co. or Fina Co.) or a random copolymer of ethylene and propylene (available from available from Phillips Petroleum Co. or Fina Co., density=0.90 g/cm$^3$) and 0.15 to 0.40 weight percent of calcium carbonate. Three types of calcium carbonate were utilized: 1) 0.7 micron from OMYA Corporation of Alpharetta, Ga.; 2) 1.4 microns from OMYA Corporation of Alpharetta, Ga.; and 3) 3.0 microns from Micro Minerals USA, Talc Co. of Norway, Polar Minerals of Mount Vernon, Ind. or Georgia Marble Co. of Kennesaw, Ga. All particles were surface-treated with a fatty acid to improve dispersion. Samples for physical and mechanical testing were prepared by a Cincinnati Milacron injection molding machine.

Table 1 shows that the calcium carbonate strongly influences the kinetics of polypropylene crystallization by decreasing crystallization temperature ($T_C$) more than 5–10° C. A decreased crystallization temperature means that the polymeric material, blend, or closure formed from the polymeric material or blend will be more ductile and have an increased impact resistance.

This is a remarkable result, in that polypropylene additives conventionally increase crystallization temperature, due to a nucleation effect. For example, talc is a conventional filler. When it is added to polypropylene, $T_C$ increases since talc acts as a nucleating agent, as shown in Table 2. The increased $T_C$ indicates a decreased impact resistance for closures made from the compositions with talc added.

TABLE 1

DSC Crystallization and Melting Data for
Polypropylene/CaCO$_3$ Blends Having Different Grades of CaCO$_3$

| Composition | | Crystallization $T_c$ (° C.) | | Melting $T_m$ (° C.) | |
|---|---|---|---|---|---|
| Blend | (weight %) | $T_c$ Onset | $T_c$ Peak | Onset | Peak |
| PP$^1$ | 100% | 130.67 | 126.80 | 159.13 | 164.42 |
| PP$^1$/CaCO$_3^2$ | 85:15 | 120.04 | 115.72 | 155.47 | 161.6 |
| PP$^1$/CaCO$_3^2$ | 80:20 | 120.10 | 115.97 | 155.43 | 161.08 |
| PP$^1$/CaCO$_3^2$ | 75:25 | 120.22 | 116.22 | 155.09 | 160.50 |

TABLE 1-continued

DSC Crystallization and Melting Data for
Polypropylene/CaCO$_3$ Blends Having Different Grades of CaCO$_3$

| Blend | Composition (weight %) | Crystallization T$_c$ (° C.) T$_c$ Onset | T$_c$ Peak | Melting T$_m$ (° C.) Onset | Peak |
|---|---|---|---|---|---|
| PP$^1$/CaCO$_3$$^2$ | 70:30 | 120.51 | 116.72 | 155.79 | 160.42 |
| PP$^1$/CaCO$_3$$^2$ | 60:40 | 120.93 | 117.93 | 155.79 | 160.58 |
| PP$^1$/CaCO$_3$$^3$ | 85:15 | 123.11 | 119.38 | 155.25 | 161.50 |
| PP$^1$/CaCO$_3$$^3$ | 75:25 | 124.37 | 120.88 | 156.73 | 161.67 |
| PP$^1$/CaCO$_3$$^3$ | 60:40 | 124.29 | 121.05 | 157.10 | 161.25 |
| PP$^1$/CaCO$_3$$^4$ | 95:5 | 129.02 | 125.47 | 159.61 | 163.58 |
| PP$^1$/CaCO$_3$$^4$ | 90:10 | 125.87 | 122.27 | 158.26 | 162.50 |
| PP$^1$/CaCO$_3$$^4$ | 85:15 | 125.68 | 122.13 | 158.67 | 162.58 |
| PP$^1$/CaCO$_3$$^4$ | 80:20 | 125.02 | 121.38 | 158.42 | 162.25 |
| PP$^1$/CaCO$_3$$^4$ | 75:25 | 124.96 | 121.22 | 158.60 | 162.58 |
| PP$^1$/CaCO$_3$$^4$ | 70:30 | 124.75 | 121.05 | 157.94 | 162.58 |
| PP$^1$/CaCO$_3$$^4$ | 65:35 | 124.08 | 120.13 | 157.43 | 161.50 |

$^1$= polypropylene homopolymer
$^2$= calcium carbonate C-11, available from Georgia Marble, 3μ particle size.
$^3$= calcium carbonate available from Polar Minerals Co., 3–3.5μ particle size.
$^4$= calcium carbonate Microdol Extra, available from Micro Mineral USA and Talc Co. of Norway, 3μ particle size.

TABLE 2

DSC Crystallization Data for Polypropylene Blended with Filler Talc

| Talc (% by weight) | T$_c$ (° C.) |
|---|---|
| 15 | 123.204 |
| 5 | 122.131 |
| 2 | 121.103 |
| 0.5 | 117.526 |
| 0.1 | 116.241 |
| none | 115.319 |

EXAMPLE 2

To determine whether polymeric compositions of the present invention have increased stiffness, tensile and flexural properties of various blends were evaluated. Each data point represents an average of at least five samples.

Stiffness is the capacity of the structure to resist elastic deformation under stress. Youngs' modulus, also known as the modulus of elasticity, is the ratio of stress (nominal) to corresponding strain below the proportional limit of a material, and can be determined according to ASTM D-638-95. Flexural modulus, also known as the tangent modulus of elasticity, is the ratio within the elastic limit of stress to corresponding strain, and can be determined according to ASTM D-790-95A.

Figure 3:
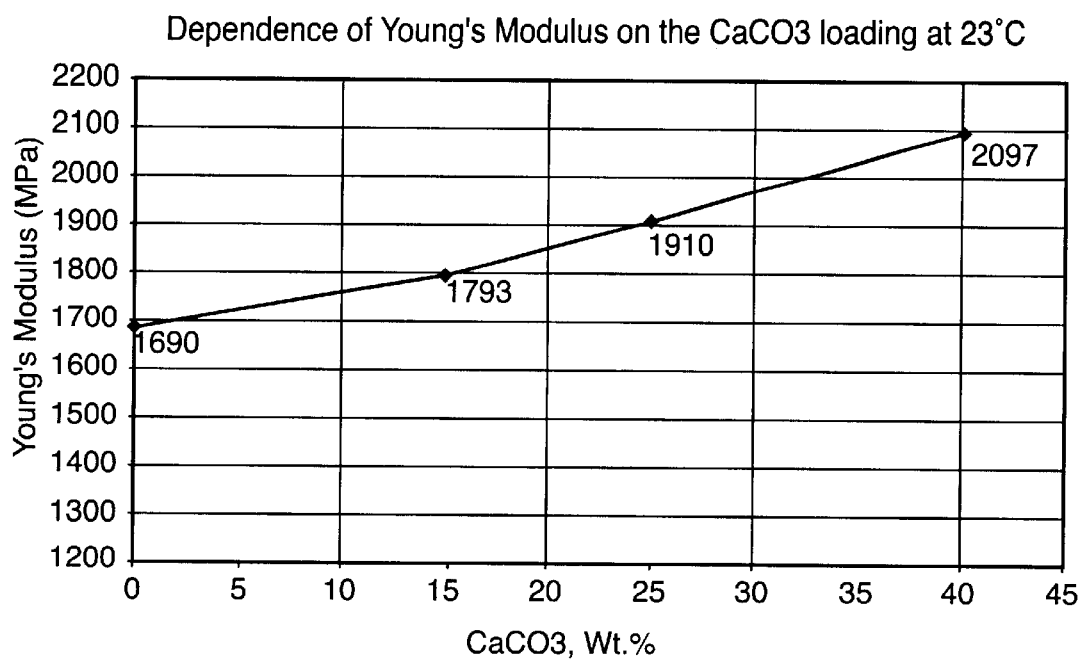
FIG. 3 shows the dependence of Youngs' Modulus on the amount of calcium carbonate in compositions at ambient temperature.
Figure 4:
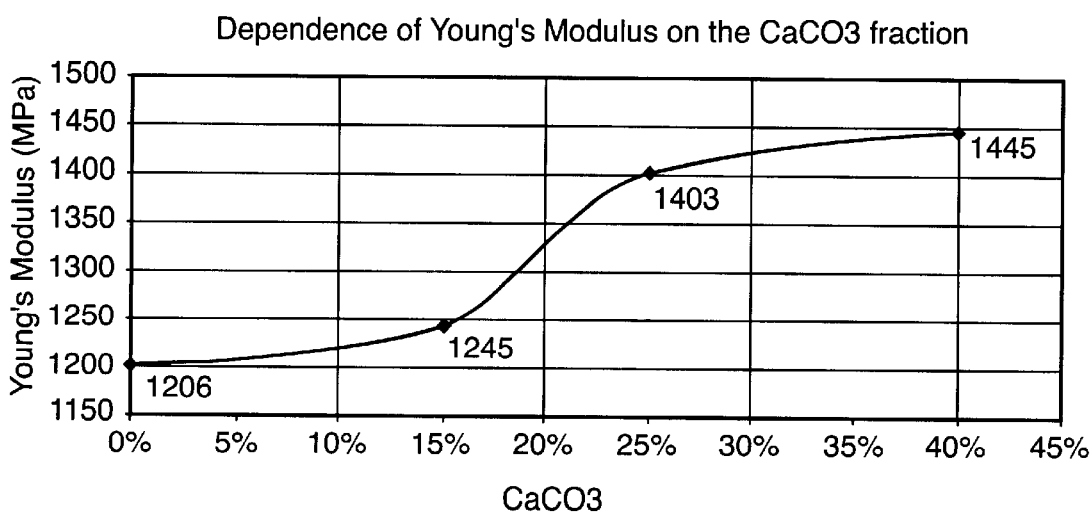
FIG. 4 shows the dependence of Youngs' Modulus on the amount of calcium carbonate in compositions at 42° C.

FIGS. 3 and 4 illustrate stiffness properties by presenting the dependence of Youngs' modulus on the amount of calcium carbonate in the composition containing polypropylene homopolymer. ASTM D-638-95 was utilized to determine this tensile property. The data for FIG. 3 was obtained based upon addition of calcium carbonate CS11, (3 micron particle size) available from Georgia Marble Co. at ambient temperature (23° C.); while the data for FIG. 4 was obtained based upon addition of calcium carbonate 8103C, (3.0–3.5 micron particle size) available from Polar Minerals, at elevated temperature (42° C.).

The flex modulus of a material is also an indicator of stiffness. A higher value for flex modulus indicates a stiffer composition. ASTM D-790-95 was utilized to determine flexural properties. Table 3 illustrates that when calcium carbonate is added to polymer, stiffness increases. Therefore, the compositions of the present invention result in an increase in stiffness and impact strength. If the time for the break is longer, the crack propagates more slowly, which is advantageous to any structural material, or a plastic part such as a closure.

Normally, the higher the stiffness, the lower the impact strength, so the compositions of the present invention have unexpected properties.

TABLE 3

Mechanical Properties of PP and PP Blends with CaCO$_3$ at 23° C.

| Material | Composition (weight %) | Flex Modulus @ Room Temp. (Mpa) | Stress @ Max Load @ Room Temp. (Mpa) |
|---|---|---|---|
| PP$^1$ | 100 | 1736.10 | 48.54 |
| PP$^1$/CaCO$_3$$^2$ | 75/25 | 2068.17 | 44.19 |
| Copolymer$^5$ | 100 | 1862.06 | 50.19 |
| Copolymer$^5$/CaCO$_3$$^2$ | 75/25 | 1981.07 | 42.19 |

$^1$= polypropylene homopolymer
$^2$= calcium carbonate C-11, available from Georgia Marble, 3μ particle size.
$^5$= random copolymer obtained by polymerization of ethylene and propylene

EXAMPLE 3

To determine whether or not the polymeric compositions of the present invention had increased impact resistance, falling weight impact properties of the compositions including polypropylene and varying amounts of calcium carbonate (Microdol Extra, available from Micro Mineral USA and Talc Co. of Norway, 3μ particle size) were determined with a Dynatup 8250 Impact Tester according to ASTM D-5628-94 (method entitled "Standard Test Method for Impact Resistance of Flat, Rigid Plastic Specimens by Means of a Falling Dart (TUP of Falling Mass.)). The Dynatup test determines the impact resistance of flat plastic samples to a falling weight. Each data point represents an average of at least ten samples. The test was run at two temperatures: 23° C. (rows 1–5 of Table 4) and −20° C. (rows 6–10 of Table 4). kgf stands for kilogram force.

Table 4 shows that the compositions of the present invention significantly increase maximum load and energy to maximum load at either temperature.

TABLE 4

Dynatup Impact Test of Polypropylene/CaCO$_3$ Compositions

| Material PP$^1$:CaCO$_3$ | Technological Regime Total Cycle Time (sec.) | Cool Time (sec.) | Max. Load Average (kgf) | Energy to Max. Load Average (J) | Time to Max. Load Average (msec.) | Total Energy Average (J) |
|---|---|---|---|---|---|---|
| | | | Impact Test at Room Temperature | | | |
| 100:0 | 18 | 7 | 27.62 | 0.54 | 2.00 | 0.82 |
| 85:15 | 18 | 7 | 78.22 | 1.70 | 2.31 | 1.86 |
| 75:25 | 18 | 7 | 81.42 | 2.15 | 2.53 | 2.32 |
| 70:30 | 18 | 7 | 92.77 | 3.34 | 3.12 | 3.59 |
| 65:35 | 18 | 7 | 86.60 | 2.37 | 2.75 | 2.58 |

TABLE 4-continued

Dynatup Impact Test of Polypropylene/CaCO₃ Compositions

| Material PP[1]:CaCO₃ | Technological Regime | | Max. Load Average (kgf) | Max. Load Average (J) | Max. Load Average (msec.) | Total Energy Average (J) |
|---|---|---|---|---|---|---|
| | Total Cycle Time (sec.) | Cool Time (sec.) | | Energy to | Time to | |
| | | | Temperature −20° C. | | | |
| 100:0 | 18 | 7 | 13.62 | 0.31 | 1.41 | 0.45 |
| 85:15 | 18 | 7 | 18.49 | 0.56 | 1.50 | 0.66 |
| 75:25 | 18 | 7 | 61.10 | 1.12 | 1.53 | 1.30 |
| 70:30 | 18 | 7 | 63.69 | 0.94 | 1.52 | 1.07 |
| 65:35 | 18 | 7 | 64.22 | 1.31 | 1.81 | 1.52 |

[1]= polypropylene homopolymer

EXAMPLE 4

To determine whether or not the polymeric compositions of the present invention had increased impact resistance, falling weight impact properties were further studied. The test procedure described in Example 3 was utilized to assess the effect of use of calcium carbonate of different sizes upon falling weight impact properties of the compositions of the present invention including polypropylene and varying amounts of calcium carbonate at room temperature.

Table 5 indicates that while the compositions of the present invention increase maximum load and energy to maximum load values regardless of particle size, the best effect for impact resistance is demonstrated by filler of particle size 1.4 to 3.0 microns.

TABLE 5

Dynatup Impact Test for Polypropylene/CaCO₃ Blends having Different Sizes of CaCO₃ at Room Temperature

| Material PP:CaCO₃ | Technological Regime | | Impact Test at Room Temperature | | | |
|---|---|---|---|---|---|---|
| | Total Cycle Time (sec.) | Cool Time (sec.) | Max. Load Average (kgf) | Energy to Max. Load Average (J) | Time to Max. Load Average (msec.) | Total Energy Average (J) |
| 100:0 | 18 | 7 | 28.64 | 0.79 | 1.97 | 0.95 |
| 85:15[2] | 18 | 7 | 75.36 | 2.12 | 2.03 | 2.35 |
| 75:25[2] | 18 | 7 | 77.08 | 2.64 | 2.45 | 2.95 |
| 85:15[6] | 18 | 7 | 43.54 | 0.82 | 1.13 | 0.99 |
| 75:25[6] | 18 | 7 | 82.23 | 2.56 | 2.18 | 2.87 |
| 85:15[7] | 18 | 7 | 45.63 | 0.84 | 1.43 | 1.08 |
| 75:25[7] | 18 | 7 | 57.40 | 1.34 | 1.68 | 1.64 |

[1]= polypropylene homopolymer
[2]= calcium carbonate C-11, available from Georgia Marble, 3μ particle size.
[6]= calcium carbonate FTHS, available from OMYA Co., 1.4μ particle size.
[7]= calcium carbonate UFT, available from OMYA Co., 0.7μ particle size.

EXAMPLE 5

The test procedure described in Example 3 was utilized to assess the effect of use of calcium carbonate of different sizes upon falling weight impact properties of the compositions of the present invention including polypropylene and varying amounts of calcium carbonate at reduced temperature.

Table 6 indicates that while the compositions of the present invention increase maximum load and energy to maximum load values regardless of particle size, the best effect for impact resistance is demonstrated by filler of particle size 1.4 to 3.0 microns.

TABLE 6

Dynatup Impact Test for Polypropylene/CaCO₃ Blends having Different Sizes of CaCO₃ at Low Temperature

| Material PP:CaCO₃ | Technological Regime | | Impact Test at Temperature −20° C. | | | |
|---|---|---|---|---|---|---|
| | Total Cycle Time (sec.) | Cool Time (sec.) | Max. Load Average (kgf) | Energy to Max. Load Average (J) | Time to Max. Load Average (msec.) | Total Energy Average (J) |
| 100:0 | 18 | 7 | 10.45 | 0.33 | 1.41 | 0.64 |
| 85:15[2] | 18 | 7 | 16.44 | 0.46 | 1.51 | 0.66 |
| 75:25[2] | 18 | 7 | 45.12 | 0.71 | 1.2 | 0.89 |
| 85:15[6] | 18 | 7 | 21.30 | 0.46 | 1.51 | 0.72 |
| 75:25[6] | 18 | 7 | 39.32 | 0.62 | 1.12 | 0.94 |
| 85:15[6] | 18 | 7 | 20.41 | 0.49 | 1.57 | 0.66 |
| 75:25[7] | 18 | 7 | 21.73 | 0.61 | 1.88 | 0.87 |

[2]= calcium carbonate C-11, available from Georgia Marble, 3μ particle size.
[6]= calcium carbonate FTHS, available from OMYA Co., 1.4μ particle size.
[7]= calcium carbonate UFT, available from OMYA Co., 0.7μ particle size.

EXAMPLE 6

The test procedure described in Example 3 was utilized to assess the effect of the variation of polymer type upon falling weight impact properties of the compositions of the present invention including calcium carbonate and either homopolymer or copolymer at room temperature.

Table 7 indicates that the toughness of the homopolymer blend increases more than 290% compared to neat resin, and the impact energy for the copolymer blend increases 60% compared to the homopolymer blend at room temperature.

TABLE 7

Dynatup Impact Test of Propylene Derived Homopolymer or Copolymer Blends with CaCO₃ at Room Temperature

| Material Polymer:CaCO₃[2] | Technological Regime | | Room Temperature | | | |
|---|---|---|---|---|---|---|
| | Total Cycle Time (sec.) | Cool Time (sec.) | Max. Load Average (kgf) | Energy to Max. Load Average (J) | Time to Max. Load Average (msec.) | Total Energy Average (J) |
| 100[1]:0 | 18 | 7 | 28.57 | 0.88 | 2.04 | 1.25 |
| 75[1]:25 | 18 | 7 | 87.55 | 3.46 | 2.70 | 3.74 |
| 100[5]:0 | 18 | 7 | 79.49 | 2.41 | 2.15 | 3.14 |
| 75[5]:25 | 18 | 7 | 89.95 | 3.93 | 2.83 | 4.26 |
| 100[1]:0 | 25 | 14 | 25.94 | 0.77 | 2.09 | 1.04 |
| 75[1]:25 | 25 | 14 | 84.48 | 3.21 | 2.61 | 3.54 |
| 100[5]:0 | 25 | 14 | 84.64 | 2.56 | 2.15 | 3.15 |
| 75[5]:25 | 25 | 14 | 82.87 | 3.48 | 2.64 | 3.76 |
| 100[1]:0 | 32 | 21 | 23.41 | 0.76 | 2.05 | 1.14 |
| 75[1]:25 | 32 | 21 | 81.33 | 2.90 | 2.49 | 3.24 |
| 75[5]:25 | 32 | 21 | 83.19 | 3.44 | 2.64 | 3.77 |

[1]= polypropylene homopolymer
[2]= calcium carbonate CS-11, available from Georgia Marble, 3μ particle size.

TABLE 7-continued

Dynatup Impact Test of Propylene Derived
Homopolymer or Copolymer Blends with CaCO₃ at Room Temperature

| Material Polymer:CaCO₃[2] | Technological Regime | | Room Temperature Energy to | | | |
|---|---|---|---|---|---|---|
| | Total Cycle Time (sec.) | Cool Time (sec.) | Max. Load Average (kgf) | Max. Load Average (J) | Time to Max. Load Average (msec.) | Total Energy Average (J) |

[5]= random copolymer obtained by polymerization of ethylene and propylene

EXAMPLE 7

The test procedure described in Example 3 was utilized to assess the effect of the variation of polymer type upon falling weight impact properties of the compositions of the present invention including calcium carbonate and either homopolymer or copolymer at reduced temperature (−20° C.).

Table 8 indicates that the toughness of the homopolymer or copolymer blends increase more than three to six times compared to neat resin.

TABLE 8

Dynatup Impact Test of Propylene Derived
Homopolymer or Copolymer Blends with CaCO₃ at Reduced Temperature

| Material Polymer:CaCO₃[2] | Technological Regime | | Room Temperature Energy to | | | |
|---|---|---|---|---|---|---|
| | Total Cycle Time (sec.) | Cool Time (sec.) | Max. Load Average (kgf) | Max. Load Average (J) | Time to Max. Load Average (msec.) | Total Energy Average (J) |
| 100[1]:0 | 18 | 7 | 11.04 | 0.27 | 1.24 | 0.50 |
| 75[1]:25 | 18 | 7 | 84.56 | 2.06 | 1.86 | 2.27 |
| 100[5]:0 | 18 | 7 | 23.62 | 0.58 | 1.69 | 0.95 |
| 75[5]:25 | 18 | 7 | 93.99 | 2.22 | 1.85 | 2.47 |
| 100[1]:0 | 25 | 14 | 12.37 | 0.23 | 1.06 | 0.50 |
| 75[1]:25 | 25 | 14 | 77.88 | 1.60 | 1.59 | 1.81 |
| 100[5]:0 | 25 | 14 | 23.24 | 0.58 | 1.8 | 0.96 |
| 75[5]:25 | 25 | 14 | 94.13 | 2.31 | 1.87 | 2.56 |
| 100[1]:0 | 32 | 21 | 12.43 | 0.27 | 1.3 | 0.51 |
| 75[1]:25 | 32 | 21 | 72.45 | 1.41 | 1.59 | 1.62 |
| 75[5]:25 | 32 | 21 | 82.47 | 1.76 | 1.72 | 1.99 |

[1]= polypropylene homopolymer
[2]= calcium carbonate C-11, available from Georgia Marble, 3μ particle size.
[5]= random copolymer obtained by polymerization of ethylene and propylene

EXAMPLE 8

To determine the effect of various cold temperatures on strength properties of the blends of the present invention, Izod Impact tests (ASTM D-256-93A, method entitled "Standard Test Method for Izod—Determining the Pendulum Impact Resistance of Notched Specimens of Plastic Izod Test") were conducted at 0° C., −20° C. and −40° C. on blends containing varied amounts of calcium carbonate. Samples were molded as per ASTM D-4101-95B (method entitled "Standard Specification for Propylene Plastic Injection and Extrusion Materials"). Samples were conditioned over forty hours at 23° C. and 50 percent relative humidity per ASTM D-618-95 (method entitled "Standard Practice for Conditioning Plastics and Electrical Insulating Material for Testing") after notching and two hours at the testing temperature of 0° C., −20° C. and −40° C. as indicated in Table 9. The notching generated an artificial crack in the test material, which was then tested with a pendulum impactor.

As indicated in Table 9, similar impact behavior is observed at each tested temperature. Izod impacts at various temperatures was measured in Joules per meter (J/m). Each of the blends showed improved performance over polymer alone.

TABLE 9

Izod Impact Test of Polypropylene[1] and Calcium Carbonate Blends with different grades of CaCO₃ at Various Cold Temperatures

| Temperature Filler | PP[1] | Calcium Carbonate[2] | | | Calcium Carbonate[3] | | | Calcium Carbonate[4] | |
|---|---|---|---|---|---|---|---|---|---|
| loading | none | 15% | 25% | 40% | 15% | 25% | 40% | 15% | 25% |
| Izod Impact at 0° C. | 16.94 | 29.12 | 24.77 | 26.29 | 23.57 | 24.35 | 24.84 | 24.41 | 25.15 |
| Izod Impact at −20° C. | 15.36 | 28.03 | 21.16 | 23.73 | 25.28 | 21.17 | 24.88 | 20.71 | 21.47 |
| Izod Impact at −40° C. | 17.56 | 25.56 | 21.06 | 25.09 | 23.75 | 22.95 | 22.99 | 22.15 | 22.53 |

[1]= polypropylene homopolymer
[2]= calcium carbonate C-11, available from Georgia Marble, 3μ particle size.
[3]= calcium carbonate available from Polar Mineral Co., 3–3.5μ particle size.
[4]= calcium carbonate Microdol Extra, available from Micro Mineral Co., 3μ particle size.

EXAMPLE 9

To test the properties of closures made from the polymeric compositions of the present invention, 28 AQUALOK III closures (a type of closure made by Alcoa CSI) were molded from polypropylene compounded with varying amounts of calcium carbonate, and tested according to the procedure described in Example 3. The calcium carbonate utilized was 8103C, available from Polar Minerals, of particle size 2.5 to 3.5 microns. The polypropylene was obtained from Phillips Petroleum Company. Some of the test blends also included pigment, to make colored closures at ambient temperature. Ppm stands for parts per minute.

The results in Table 10 show that addition of calcium carbonate enhances each of the measured properties. Therefore, impact resistance of closures made from the ploymeric compositions is improved.

TABLE 10

Impact Resistance of Closures made from Blends of Polypropylene and Calcium Carbonate

| Polymer:CaCO$_3$ | Speed of Machine (ppm) | Average Max. Load (lbs) | Average Energy to Max. Load (inch lbs) | Average Time to Max. Load (msec) |
| --- | --- | --- | --- | --- |
| 100:0 | 300 | 147.72 | 6.24 | 0.78 |
| 100:0 | 550 | 131.57 | 5.28 | 0.72 |
| 100:0 | 550[1] | 144.89 | 6.96 | 0.77 |
| 85:15 | 300 | 190.01 | 14.04 | 1.27 |
| 85:15 | 550 | 182.89 | 13.20 | 1.30 |
| 85:15 | 550[1] | 177.78 | 12.72 | 1.25 |
| 75:25 | 300 | 266.02 | 25.56 | 1.73 |
| 75:25 | 550 | 222.27 | 20.04 | 1.60 |
| 75:25 | 550[1] | 191.20 | 14.76 | 1.28 |
| 60:40 | 300 | 558.25 | 59.88 | 2.67 |
| 60:40 | 550 | 449.66 | 46.92 | 2.72 |
| 60:40 | 550[1] | 542.07 | 56.52 | 2.78 |

[1] = 1.6% by weight of color concentrate

EXAMPLE 10

To test the properties of closures made from the polymeric compositions of the present invention, 28DL ULTRA closures (a type of closure made by Alcoa CSI) were molded from polypropylene compounded with varying amounts of calcium carbonate, and tested according to the procedure described in Example 3. The calcium carbonate utilized was Microdol Extra, available from Micro Mineral Co., of particle size 3.0 microns. The polypropylene was obtained from Phillips Petroleum Company. Some of the test blends also included pigment, to make colored closures.

The results in Table 11 show that addition of calcium carbonate starting from 15% loading enhances each of the measured properties. Therefore, impact resistance of closures made from the polymeric compositions is improved.

TABLE 11

Impact Resistance of Closures made from Blends of Polypropylene and Calcium Carbonate

| Polymer:CaCO$_3$ | Speed of Machine (ppm) | Average Max. Load (lbs) | Average Energy to Max. Load (inch lbs) | Average Time to Max. Load (msec) |
| --- | --- | --- | --- | --- |
| 100:0 | 300 | 147.72 | 6.24 | 0.78 |
| 100:0 | 550 | 131.57 | 5.28 | 0.72 |
| 100:0 | 550[1] | 144.89 | 6.96 | 0.77 |
| 95:5 | 550 | 110.45 | 5.04 | 0.65 |
| 95:5 | 600 | 108.21 | 4.68 | 0.55 |
| 90:10 | 550 | 145.11 | 8.64 | 0.79 |
| 90:10 | 600 | 119.05 | 5.64 | 0.59 |
| 85:15 | 500[1] | 164.40 | 11.04 | 0.8 |
| 85:15 | 500 | 151.34 | 9.24 | 0.74 |
| 80:20 | 500[2] | 164.02 | 11.52 | 0.83 |
| 80:20 | 500[1] | 156.65 | 10.44 | 0.78 |
| 75:25 | 550 | 164.51 | 12.12 | 0.89 |
| 70:30 | 500[1] | 175.16 | 14.52 | 1.09 |
| 70:30 | 550 | 177.84 | 14.4 | 1.02 |
| 65:35 | 500[1] | 148.03 | 13.56 | 1.22 |
| 65:35 | 550 | 160.41 | 13.32 | 1.08 |

[1] = 2.2% by weight of color concentrate
[2] = 1.6% by weight of color concentrate All references cited are hereby incorporated by reference.

The present invention is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

Changes can be made in the composition, operation and arrangement of the method of the present invention described herein without departing from the concept and scope of the invention as defined in the following claims:

I claim:

1. A closure for a container comprising a top and an annular skirt, said closure is formed of a stiff and impact resistant polymeric blend, the blend comprising from about 60 to about 75 weight percent of a polymer selected from the group consisting of poly(propylene) and a random copolymer of ethylene and propylene; and from about 25 to about 35 weight percent of calcium carbonate particles treated with fatty acid, wherein said calcium carbonate particles have a particle size of from about 2.5 to about 3.5 microns, wherein said closure has a falling weight impact resistance at −20° C. of from about 0.4 to about 2.5 joules and a Youngs' modulus at room temperature of from about 1800 to about 2200 megapascals.

2. A closure for a container comprising a top and an annular skirt, said closure is formed of a stiff and impact resistant polymeric blend, the blend comprising from about 60 to about 75 weight percent of a polymer selected from the group consisting of poly(propylene) and a random copolymer of ethylene and propylene and from about 25 to about 35 weight percent of calcium carbonate particles treated with fatty acid, wherein said calcium carbonate particles have a particle size of from about 2.5 to about 3.5 microns, wherein said closure has a falling weight impact resistance at room temperature of from about 0.8 to about 4.0 joules and a Youngs' modulus at room temperature of from about 1800 to about 2200 megapascals.

3. A closure for a container comprising a top and an annular skirt, said closure is formed of a stiff and impact resistant polymeric blend, the blend comprising from about 60 to about 75 weight percent of a polymer selected from the group consisting of poly(propylene) and a random copolymer of ethylene and propylene and from about 25 to about 35 weight percent of calcium carbonate particles treated with fatty acid, wherein said calcium carbonate particles have a particle size of from about 2.5 to about 3.5 microns, wherein said closure has a falling weight impact resistance at −20° C. of from about 0.4 to about 2.5 joules, a falling weight impact resistance at room temperature of from about 0.8 to about 4.0 joules and a Youngs' modulus at room temperature of from about 1800 to about 2200 megapascals.

4. A closure for a container comprising a top and an annular skirt, said closure is formed of a stiff and impact resistant polymeric blend, the blend comprising from about 60 to about 75 weight percent of a polypropylene homopolymer; and from about 25 to about 35 weight percent of calcium carbonate particles treated with fatty acid, wherein said calcium carbonate particles have a particle size of from about 2.5 to about 3.5 microns, wherein said closure has a falling weight impact resistance at −20° C. of from about 0.4 to about 2.5 joules and a Youngs' modulus at room temperature of from about 1800 to about 2200 megapascals.

5. A closure for a container comprising a top and an annular skirt, said closure is formed of a stiff and impact resistant polymeric blend, the blend comprising from about 60 to about 75 weight percent of a polypropylene homopolymer; and from about 25 to about 35 weight percent of calcium carbonate particles treated with fatty acid, wherein said calcium carbonate particles have a particle size of from about 2.5 to about 3.5 microns, wherein said closure has a falling weight impact resistance at room temperature of from about 0.8 to about 4.0 joules and a Youngs' modulus at room temperature of from about 1800 to about 2200 megapascals.

6. A closure for a container comprising a top and an annular skirt, said closure is formed of a stiff and impact resistant polymeric blend, the blend comprising from about 60 to about 75 weight percent of a polypropylene homopolymer; and from about 25 to about 35 weight percent of calcium carbonate particles treated with fatty acid, wherein said calcium carbonate particles have a particle size of from about 2.5 to about 3.5 microns, wherein said closure has a falling weight impact resistance at −20° C. of from about 0.4 to about 2.5 joules, a falling weight impact resistance at room temperature of from about 0.8 to about 4.0 joules and a Youngs' modulus at room temperature of from about 1800 to about 2200 megapascals.

* * * * *